United States Patent Office 3,804,716
Patented Apr. 16, 1974

---

3,804,716
STARCH CONVERSION PRODUCTS AND PROCESSES FOR PREPARING SAME
David P. Langlois, 36 Cammo Grove, Edinburgh EH 4 8Ex, Scotland
No Drawing. Continuation-in-part of abandoned application Ser. No. 38,552, May 18, 1970. This application Jan. 31, 1972, Ser. No. 222,378
Int. Cl. C12b 1/00
U.S. Cl. 195—31 R    13 Claims

ABSTRACT OF THE DISCLOSURE

A novel starch conversion product having at least 80 percent by weight of its saccharide components containing 5 to 12 saccharide units, and being useful for making hard candies and lozenges. The product containing this specific range of saccharide units may be prepared by an enzymolysis process in which inhibited starch particles are suspended in water, heated for a time and at temperatures sufficient to cause swelling of the starch particles, and then hydrolyzed with a specific enzyme which is capable of splitting high molecular weight starch molecules randomly throughout the molecule.

---

This application is a continuation-in-part of my earlier co-pending application, Ser. No. 38,552, filed May 18, 1970, now abandoned.

FIELD OF THE INVENTION

This invention relates to a new starch conversion product which is neither hygroscopic nor subject to crystallization upon concentration. The invention also relates to processes for preparing starch conversion products which have unique specific saccharide distributions, and, hence, specific chemical and physical properties.

BACKGROUND OF THE INVENTION

Currently a variety of starch conversion products are manufactured and marketed in the industry. Typically such starch conversion or hydrolysis products are composed of a number of components including: dextrose, a monosaccharide; maltose, a disaccharide, higher sugars, which include the trisaccharides, and tetrasaccharides; and dextrins, which include all polymeric saccharides higher than tetrasaccharides. Dextrose, of course, represents the ultimate degree of conversion or hydrolysis of starch, whereas the higher molecular weight dextrins represent the smallest degree of conversion of hydrolysis. Maltose and the higher sugars, in turn, represent intermediate degrees of conversion of starch.

Chemical and physical properties, such as hygroscopicity and dextrin crystallization at higher concentrations, of any particular starch conversion product, is dependent upon the relative distribution of the saccharide components in the product. Low molecular weight saccharides, particularly dextrose and maltose, for example, tend to render such conversion products hygroscopic. In contrast, an abundance of high molecular weight polysaccharides, such as polymers containing 20 or more saccharide monomeric units, tend to render such conversion products subject to crystallization of the dextrins upon concentration. Although a variety of processes have been employed in an attempt to balance such properties by controlling the distribution of saccharides in the conversion product (or syrup), none has proved entirely satisfactory.

Typically starch conversion products are converted to a degree not to exceed 30 percent measured by the dextrose equivalent (hereinafter referred to as D.E.). Very low conversion products will be 20 D.E. or below. There are three conventional methods for making these low conversion starch products: straight acid conversion, straight enzyme conversion, and a combined acid-enzyme conversion. In all of these processes the starch is dispersed in water and the catalyst added to promote the reaction to the desired degree of conversion or hydrolysis. Normally pastes of native starch are so viscous at temperatures which are safe for enzyme action that in the latter two processes a thinning step is employed so that one can work at reasonably high starch concentrations; that is to say, above 15 percent. Normally conversions are carried out at 30 to 35 percent concentrations.

In the straight acid starch conversion process the acid catalyst is added to the starch slurry before the starch is pasted and the thinning of the starch occurs as part of the conversion process. The starch solution is heated under pressure to elevated temperatures until the desired degree of conversion is obtained. It is then cooled, the acid neutralized to approximately 4.8 pH, and the insoluble matter removed by filtration. The syrup is refined by carbon treatment and is concentrated to a heavy syrup or spray dried to an approximately anhydrous mass for storage.

In the acid-enzyme starch conversion process the starch slurry is first thinned by acid. The process is exactly the same as the acid conversion process except that the conversion is stopped when the degree of conversion is only 10 to 50 D.E. The solution is sufficiently thin so that it may be cooled to a temperature safe for the action of enzymes. The acid is neutralized and the pH of the solution is adjusted to about 5 pH. The enzyme is added and the conversion is allowed to continue until the desired D.E. is obtained. The syrup is processed for use and storage the same as the straight acid converted syrup.

In the straight syrup enzyme conversion process, the thinning step is performed by using bacterial alpha amylase. Bacterial alpha amylase is added to the 30 to 35 percent starch slurry before heating. The starch slurry is slowly heated to its gelatinization point and held there until sufficient thinning of the paste has been effected. Generally, the thinning step is followed by a heating to boiling and then cooling it to a temperature for safe enzyme action. After the addition of more alpha amylase to the starch, hydrolysis is continued until the desired starch conversion is obtained. The starch conversion product is then finished off in the usual manner.

In all of the products prepared by these processes the problem of saccharide distribution is the same. The catalyst is working on a solution and hence will attack the low molecular weight saccharides as well as the high molecular weight saccharides at much the same rate. Very early in the reaction some very low molecular weight components such as dextrose, maltose, trisaccharides, and the like, will be formed. The effect of small amounts of these components on the D.E. of the syrup and hence on the saccharide distribution will be apparent if we look at the following table which gives the approximate D.E.'s of various saccharides. Although these values may be slightly different for different methods of measuring the D.E., the point illustrated is the same.

| Units saccharide: | D.E. |
|---|---|
| 1 (dextrose) | 100 |
| 2 (maltose) | 50 |
| 3 | 33 |
| 5 | 20 |
| 10 | 10 |
| 20 | 5 |
| 30 | 3 |

By way of example, the average size of the saccharides of a syrup having a D.E. of 20 is five units. It is clear, therefore, that for every percent of dextrose present in the syrup there must be about 5 percent of a 30 unit saccharide, or 5.5 percent of a 20 unit saccharide, or 8 percent of a 10 unit saccharide, or some other equivalent, in order to maintain an average of 20 D.E.

Naturally the recurring problem in existing processes for the production of starch conversion products is that the high quantities of dextrose and maltose tend to make the product hygroscopic, while the offsetting high quantities of high molecular weight polysaccharides make the product subject to dextrin crystallization when the syrups are concentrated to 70 percent solids or higher.

The distribution of saccharide components for some of the most widely known and commercially used corn starch conversion products is illustrative of the nonuniformity in saccharide distribution which results from existing conversion processes. For example, the acid enzyme converted corn starch product typically has the following distribution of saccharide components:

Acid-enzyme corn syrup or acid-enzyme converted cornstarch product

| Saccharide component: | Percent by weight |
|---|---|
| Dextrose (monosaccharide) | 40 |
| Maltose (disacchardie) | 40 |
| Three to six Saccharide units | 12 |
| Greater than six saccharide units | 8 |

Another commercially available acid-enzyme converted corn starch product, generally known as high maltose syrup, has the following distribution of polysaccharide components:

High Maltose Syrup

| Polysacchardie Component: | Percent by weight |
|---|---|
| Dextrose (monosaccharide) | 6 |
| Maltose (disacchardie) | 57 |
| Greater than disaccharide units | 33 |

The above-mentioned syrups are high conversion syrups. The acid-enzyme syrup is typically 63 D.E. and the high maltose syrup is typically 38-40 D.E. Naturally, the amount of high molecular weight polysaccharide is very low so dextrin crystallization does not occur. The amount of low molecular weight material being very high the syrups are very hydroscopic. If either of these syrups is evaporated to dryness and allowed to stand in an atmosphere of 65 percent relative humidity it will absorb moisture from the air and become a syrup again. Neither product can be stored as a dry product open to the atomsphere. The acid-enzyme syrup is more hygroscopic than the high maltose syrup.

There are two low conversion starch products made on a more or less commercial scale. These products are designed to have low hygroscopicity. One is made from regular corn starch and the other is made from waxy maize starch. Both have roughly the same composition.

Low conversion starch syrup

| Saccaride component: | Percent by weight |
|---|---|
| Maltose (disaccharide) | 15-20 |
| Three to six saccaride units | 5-20 |
| Above six saccharide units | 80-60 |

These two syrups being low in the lower molecular weight saccharides are relatively low in hygroscopicity. They do have enough of the high molecular weight saccharides (greater than 20 units), so that they are subject to dextrin crystallization when concentrated. The syrup made from the waxy maize starch has less tendency to dextrin crystallization because the dextrins tend to be more branched.

A syrup which is non-hydroscopic and not subject to any dextrin crystallization has never been produced by any existing process.

Another approach which has been employed in an attempt to control the distribution of saccharide components in a starch conversion product is suggested in U.S. Pat. No. 2,891,869 to Langlois. There it is suggested that two or more enzymes having different starch converting characteristics can be used to convert starches into syrups having a variety of physical properties and saccharide distributions. This approach, however, is similarly ineffective in producing a starch conversion product with minimal low and high molecular weight saccharides. The obvious result, of course, is that the products obtained by this process are both hygroscopic and subject to dextrin crystallization upon concentration.

Finally, it has been suggested in U.S. Pat. No. 3,525,672 to Wurzburg that an unrelated problem of preparing modified starch products, in contrast with the starch conversion products of this invention, can be solved by subjecting a cross-linked starch to the action of a specific type of enzyme, e.g., one which is capable of digesting the outer branches of the amylpectin molecule and whose action will not include or go beyond the, 1,6 branching point of the amylpectin molecule. In short, the Wurzburg patent teaches the use of a specific enzyme, in particular beta-amylase, which will selectively split the 1,4 linkages of a starch molecule at its outer branches, but will not under any circumstances split the 1,6 linkages in the molecule or 1,4 linkages in the backbone of the molecule. Thus, rather than preparing a starch conversion product having at least 80 percent by weight of its saccharide components containing 5 to 12 saccharide units, Wurzburg teaches a method for making high molecular weight modified starches in which maltose has been split from the molecule branches.

Accordingly, the Wurzburg patent which teaches the use of specific enzymes which attack only the non-aldehydic end of the starch molecules outer branches, column 3, line 44, and which produces undesirably high amounts of maltose as a decomposition product, column 6, lines 69–75, is not useful in the practice of the present invention.

SUMMARY OF THE INVENTION

According to this invention a novel starch conversion product is provided which has at least 80 percent by weight of its saccharide components containing from 5 to 12 saccharide units and which is characterized by being non-hygroscopic and not subject to dextrin crystallization upon concentration.

Briefly stated, the novel starch conversion product is prepared by an enzymolysis process which includes the following steps:

(1) suspending starch granular particles, which have been treated to make them insoluble in boiling water as an insoluble component of a water-containing liquid medium;

(2) heating the suspended mixture of said starch granular particles to a temperature and for a time sufficent to cause swelling of the particles, and without solubilization;

(3) reacting the starch contained in the insoluble granular particles with a starch hydrolyzing enzyme capable of randomly splitting the starch molecule until a portion of the starch is hydrolyzed; and (4) separating hydrolyzed starch contained in the liquid from the insoluble solid fractions of the mixture.

Although numerous advantages are inherent in the product and process of this invention, several advantages are worthy of particular attention. For example, unlike conventional starch conversion processes, the process of this invention can be easily carried out at concentrations of starch in the range of 36 to 50 percent by weight solids. In addition, the enzymolysis of the granular particles tends to produce a selected distribution of saccharide components in the product, namely, reduced quantities of both low and high molecular weight saccharides, such as dextrose, maltose, and 20 to 30 saccharide unit polymers. Refinement of the starch conversion product is more easily obtained, since a relatively small quantity of high molecular weight residues are available to inhibit the filtration and refining steps. Moreover, the starch conversion product obtained from the process of this invention is stable upon storage both as a syrup and as a dry powder and can be easily concentrated without crystallization of the dextrins and then reconstituted when desired at some later time.

One of the more significant and unexpected aspects of this invention, however, is the fact that, unlike all conventional starch conversion processes, which require the solubilizing of the starch before enzyme hydrolysis, it has now been discovered that certain starch products in the granular state behave as if they were in solution because they are rapidly attacked by enzymes.

DESCRIPTION OF THE PREFERRED EMBODIMENT

The novel starch conversion product of this invention can generally be characterized by the fact that it has a unique distribution of polysaccharide components. In particular, a starch conversion product of this invention is characterized by having at least 80 percent by weight of its saccharide components containing about 5 to 12 saccharide units. Such a saccharide distribution is extremely advantageous because the low molecular weight saccharides (dextrose and maltose) and the high molecular weight polysaccharides (13 to 30 saccharide monomeric units) are virtually eliminated.

As a result of the controlled distribution of saccharide components in the starch conversion product of the present invention, the product is clear and the dextrins are non-crystallizing under normal conditions of use and concentration and the dried product is non-hygroscopic at normal exposure conditions of 65 percent relative humidity and 80° F.

The process of the present invention for preparing such starch conversion products is capable of effecting a selected distribution of saccharide components in the conversion products. As a first step in the process, starch is treated in a manner sufficient to form granular starch particles which are insoluble in boiling water and can be maintained at a particle size greater than two microns during enzymolysis.

The preparation of such granular starch particles can be accomplished in a number of ways. One highly desirable technique involves the preparation of what is known as "inhibited starch." Such "inhibited starch" is prepared, for example, by treating an uninhibited starch, which is soluble in water upon heating, with a cross-linking agent, such as epichlorohydrin, until starch granules are rendered insoluble in boiling water.

The inhibition of such starches by a cross-linking reaction renders them completely insoluble in water. For example, granular starch in a water slurry can be treated with a cross-linking agent, such as epichlorohydrin under conditions below the pasting point of the starch. This treatment includes reaction between the epichlorohydrin and the starch, which results in the preparation of crosslinked, high molecular weight starch molecules. It should be recognized, however, that excessive cross-linking of the starch granules may in fact render the granules both insoluble in boiling water and incapable of enzyme attack. In the practice of this invention, it is desirable to conduct only the degree of cross-linking necessary to render the starch granules insoluble in boiling water, but at the same time allowing such starch granules to be easily reacted with hydrolyzing enzymes.

Heretofore, in all enzyematic reactions, starch molecules are first dispersed in water before they are treated with enzymes. Accordingly, the use of an inhibited starch which is incapable of being solubilized even in boiling water, has previously been considered unsuitable for enzyme reaction. Quite unexpectedly, it has been discovered that the cross-linked, inhibited granular starches prepared by the process of this invention while maintaining their insolubility in boiling water are capable of a slight swelling and loss of birefringence so as to be reactive with enzymes. The swelling which occurs in the granular starches permits hydrolyzing enzymes to convert the starch to the desired starch conversion products of this invention.

The typical cross-linking agents which have been found to be most effective in inhibiting the starch granules to make them insoluble in boiling water include: epichlorohydrin, acrolein, formaldehyde, acetaldehyde, and phosphorus oxychloride. As previously mentioned, the degree of inhibition of the starch is desirably controlled to permit the inhibited granules to be insoluble in boiling water and yet capable of sufficient swelling to allow enzyme attack. This controlled amount of inhibition has been found to occur when the molar ratio of glucose units in the starch to cross-linking agent is in the range of about 50:1 to 500:1. Accordingly, for corn starch as little as one mole of epichlorohydrin per 500 moles of glucose units will give sufficient cross-linking. Similarly, up to ten moles of epichlorohydrin can also be used without causing excessive cross-linking to the extent that the granules are rendered incapable of enzyme hydrolysis because of their lack of ability to swell.

The granular particles which have to be treated to make them insoluble in boiling water, are suspended in a water-contained liquid medium. Typically, the liquid medium is water, although it has also been found that desirable results can also be obtained in water-alcohol solutions. In particular, aqueous-alcohol solutions of alcohols such as ethanol, methanol, propanol, butanol and pentanol are suitable for use in the practice of this invention.

The suspended granular starch particles form an insoluble component of the water-containing liquid medium. Generally, the pH requirements for the enzymolysis reaction are satisfied by maintaining the pH of the starch-liquid mixture in the range of about 4.0 to 6.5. Preferably, however, a pH range of about 5.0 to 5.2 is maintained to insure optimum reaction conditions.

After suspension of the granular particles, in the water-conditioning liquid medium, the mixture of liquid and insoluble starch granules are heated to a temperature and for a time sufficient to cause a swelling of the starch granulars. This swelling permits the enzyme reaction to commence since enzymes are carried into granules by water contained in the liquid medium. Typically, a swelling of about 35 percent by volume is sufficient to allow enzyme conversion of the starch granules. Such swelling, in turn, has been found to take place at temperatures from about 65 to 100° C. At 65° C., swelling can begin to take place, and at temperatures above 72° C., the starch will tend to lose its crystallinity.

Following the heating step, the insoluble starch granules are reacted with a starch hydrolyzing enzyme until hydrolysis takes place. The temperature requirements for the enzymolysis reaction are satisfied by maintaining the starch-liquid mixture at about 65 to 72° C. Enzymes suitable for use in the practice of this invention are the alpha amylases, which include pancreatic alpha amylase, fungal alpha amylase, malt alpha amylase, and bacterial alpha amyalse. The choice of the enzyme will depend upon the desired final product.

But it should be recognized that the specific enzymes used in the practice of this invention should be capable of splitting alpha 1,4 linkages in the backbone of the starch molecule randomly throughout the molecule. In this way, the desired distribution of components having 5 to 12 saccharide units can be provided as starch conversion products.

It is undesirable, for example, to use beta-amylase as an enzyme in the practice of this invention because large amounts of low molecular weight maltose is produced and, additionally, because beta-amylase selectively splits only 1,4 linkages on the outer branches of the molecule an not randomly throughout the entire starch molecule.

The fact that hydrolysis takes place at all is quite surprising, since the starch granules are not in solution but rather are insoluble in the liquid medium. It has been observed using microscopic analysis that the swollen starch granules, when cooled to temperatures safe for enzyme reaction, do not change form during cooling. In fact, when the enzyme is added to the suspension of granular starch particles, it is observed that the granules show little change in shape initially, despite the fact that some starch is solubilized by enzyme action. After about 25 percent of the starch is solubilized by reaction with enzyme, the granules begin to lose their shape. After solubilization of 98 percent of the starch, many of the granular shells are collapsed; and at no time during the reaction are the granular shells themselves solubilized.

Accordingly, it is believed that the ability of the treated granular starch particles to remain insoluble during the entire enzymolysis reaction accounts for the highly unexpected control over the distribution of saccharides in starch conversion product resulting from the practice of this invention. In fact, the tendency of the enzymes to remain with and attack the starch granules rather than the intermediate molecular weight hydrolyzed products, results in a final starch conversion product having at least 80 percent by weight of the saccharide components containing 5 to 12 saccharide units.

It should be recognized that the starch granular particles do not disperse in the liquid medium during reaction. As a consequence, the majority of starch particles have a size of at least two microns during the entire enzymolysis reaction. Accordingly, at so time during the enzyme hydrolysis are the granular particles themselves entirely solubilized, but rather only the hydrolyzed starch conversion products are solubilized.

In addition, it should be noted that the ultimate distribution of saccharide components in the conversion product will also be dependent to the point at which the enzymolysis reaction is terminated. Generally, the reaction mixture of starch granulars, enzyme, and liquid is centrifuged periodically to determine the extent of hydrolysis, or solubilization. It should be understood that the reaction may be terminated at any time to yield a spectrum of conversion products. If the enzymolysis reaction using alpha amylase is terminated before 80 percent by weight of the starch is reacted, the resultant conversion product will have a saccharide distribution in which at least 80 percent by weight of the saccharide components contain about 5 to 12 saccharide units. Accordingly, small amounts of both low and high molecular weight saccharides are present in the product and the product can be dried without being hygroscopic, and can be concentrated up to 75 percent by weight solids without precipitation of high molecular weight polysaccharides.

After the enzymolysis reaction is terminated, hydrolyzed starch contained in the liquid medium is separated from insoluble fractions of the liquid-starch mixture. Then the hydrolyzed starch conversion product is refined and concentrated for storage.

Although a variety of starches are suitable for use in the practice of this invention, the following starches are preferred: corn starch, tapioca starch, waxy maize starch, rice starch, wheat starch, potato starch and arrow root starch. For most purposes, corn starch will be used since it is more readily avaliable.

The starch conversion products having 5 to 12 glucose units prepared by the process of this invention may be used as builders and bodying agents in foods. In particular, however, the fact that such starch conversion products of this invention are permanently clear and not subject to dextrin crystallization at high concentrations make them highly suitable for use in making hard candies and lozenges where transparency of the final product is an important consideration. In addition, the fact that such starch conversion products of this invention are non-hygroscopic makes them even more desirable for use in candies, and sugar supplements. The starch conversion products and process of this invention are further illustrated in the following examples.

EXAMPLE 1

A slurry of 32 g. (dry substance material) starch in 50 ml. water was stirred as 5 ml. of 1.0 N NaOH was added dropwise. After all of the alkali was added 0.45 g. of epichlorohydrin was added and the slurry stirred as the temperature was raised to about 40° C. and held for 24 hours. The starch was adjusted to 4.8 pH filtered, washed, dried to equilibrium moisture and stored.

The starch prepared by this procedure is "inhibited" in the sense that starch granules are not soluble in boiling water.

EXAMPLE 2

An "inhibited" starch such as produced in Example 1, which is cross-linked to the point that is not soluble in boiling water, is employed for the reaction. A slurry of 162 g. (dry substance material) of this starch in 250 ml. of water is heated to boiling and held at that temperature for about 15 minutes after which it is cooled to 65° C. At this temperature 1000 units of alpha amylase (Novo Units, Novo Industries, Copenhagen, Denmark) are added and the mixture stirred to maintain a suspension. The starch will become solubilized, while the granular shells remain in their insoluble form. The rate of solubilization can be followed by withdrawing a sample, centrifuging to remove the insoluble material and determining the soluble material by any suitable method. The refractive index tables for corn syrup, published by the Corn Industries Research Foundation, Washington, D.C., provides a simple means of doing this. When the desired extent of solubilization has been achieved, the reaction may be terminated by heating the solution to boiling to inactivate the enzyme. One may also wish to control the reaction by measuring the degree of conversion of the solubilized starch. A sample is withdrawn, centrifuged and a D.E. determination made on the supernatant solution. When the desired degree of conversion is obtained, the reaction may be terminated as described above. The starch conversion product prepared by this process is non-hygroscopic and not subject to dextrin crystallization at high temperatures.

The starch conversion product may be worked up in any suitable fashion. It may be filtered with a filter aid to clarify the solution, decolorized with carbon if a colorless product is desired and concentrated to a heavy syrup. Since the solution is stable at high concentrations, it may be stored at the high concentration. If a powdered product is desired it may be dehydrated by spray drying or by another dehydrating method.

EXAMPLE 3

An "inhibited" starch is required for this reaction. It is a starch which has been treated with a "cross-linking" reagent such as epichlorohydrin to the extent that it is not soluble in boiling water. A slurry of 162 g. (dry substance material) of this starch in 250 ml. of water is heated to boiling and held at this temperature for about 10 minutes after which it is cooled to 65° C. The pH of the slurry is adjusted to 5.5 and an amount of alpha amylase (*Bacillus subtilis*) equivalent to 50 SKB units is added. Slow agitation is maintained to keep the starch in suspension. After 24 hours the solution was filtered. The hydrolyzate is about 30 D.E. For storage the hydrolyzate is concentrated to 75 percent solids. It is fluid and clear and remains thus on long storage.

EXAMPLE 4

A slurry of 162 g. (dry substance material) of "inhibited" corn starch in 250 ml. of water is boiled for 10 minutes and cooled to 65° C. An amount of alpha amylase (*Bacillus subtilis*) equivalent to 500 SKB units is added and the pH adjusted to 5.5. After 2 hours the reaction is stopped by heating the solution to boiling. The solution is clarified either by filtering or centrifugation and the clear liquid concentrated to 75 percent solids for storage. The syrup will have a D.E. of approximately 20.

Other modes for applying the principles of the invention may be employed, change being made in regard to details described, provided the features stated in any of the following claims or the equivalent of such be employed.

I claim:

1. In a process for the enzymolysis of starch which is adapted to produce starch conversion products having a selected distribution of saccharide components, the steps comprising:
   suspending insoluble granular particles of an inhibited starch product as an insoluble component in a liquid medium containing water;
   said insoluble granular particles of inhibited starch product characterized by a size in which the majority are greater than two microns throughout enzymolysis and by insolubility in boiling water;
   heating said mixture of liquid and insoluble starch granular particles in a water containing medium to temperatures and for a time sufficient to cause swelling of said insoluble starch granular particles;
   reacting the starch in said insoluble starch granular particles with at least one starch hydrolysis enzyme in said liquid medium until at least a portion of the starch is hydrolyzed;
   said starch hydrolysis enzyme being capable of randomly splitting 1,4 linkages throughout a starch molecule;
   said liquid medium having a pH in the range from about 4.0 to 6.5 during enzymolysis;
   separating hydrolyzed starch contained in said liquid medium from insoluble solid fractions of said mixture.

2. The process defined in claim 1 wherein said insoluble granular particles of inhibited starch product are prepared by reacting uninhibited starch granules with an amount of cross-linking agent sufficient to render said starch granules inhibited and insoluble in boiling water but capable of swelling upon the application of heat.

3. The process defined in claim 2 wherein said cross-linking agent is selected from the group consisting of: epichlorohydrin, acrolein, formaldehyde, acetaldehyde, and phosphorous oxychloride.

4. The process defined in claim 2 wherein the molar ratio of glucose units in said uninhibited starch granules to cross-linking agent is in the range of about 500:1 to 50:1.

5. The process of claim 1 wherein said starch is selected from the group consisting of: corn starch, tapioca starch, waxy maize starch, rice starch, wheat starch, potato starch and arrow root starch.

6. The process of claim 1 wherein said starch hydrolyzing enzyme is selected from the group consisting of: pancreatic alpha amylase, fungal alpha amylase, malt alpha amylase and bacterial alpha amylase.

7. The process of claim 1 wherein the heating of said mixture of liquid and insoluble granular particles is carried out at a temperature of about 65 to 100° C. for a time sufficient to cause swelling of said starch granular particles.

8. The process of claim 1 wherein the concentration of starch in said water containing liquid medium is within the range of about 36 to 50 percent by weight of starch.

9. The process of claim 1 wherein the reaction of starch with starch hydrolyzing enzyme is carried out until 80 percent or less by weight of said starch is hydrolyzed.

10. The process of claim 1 wherein the hydrolyzed starch contained in said liquid is filtered, refined and concentrated for storage.

11. The process of claim 10 wheerin said hydrolyzed starch is concentrated to at least 70 percent by weight hydrolyzed starch without dextrin crystallizing.

12. The process of claim 1 wherein the pH of said mixture of liquid and insoluble starch granulars is in the range of about 5.0 to 5.2.

13. In a process for preparing a starch conversion product having at least 80 percent by weight of the saccharide components contained therein containing from 5 to 12 saccharide units, the steps comprising:
    suspending insoluble granular particles of an inhibited starch product as an insoluble component in a liquid medium containing water;
    said insoluble granular particles of inhibited starch of a size the majority of which is greater than two microns throughout enzymolysis.
    heating said mixture of liquid and insoluble starch granular particles in a water containing medium to temperatures and for a time sufficient to cause swelling of said starch granular particles;
    reacting the starch in said insoluble starch granular particles with at least one alpha amylase until at least a portion of the starch is hydrolyzed;
    said liquid medium having a pH in the range from about 4.5 to 6.5 during enzymolysis; and
    separating hydrolyzed starch contained in the liquid and insoluble solid fractions of said mixture.

References Cited
UNITED STATES PATENTS

| | | | |
|---|---|---|---|
| 3,505,110 | 4/1970 | Kesler et al. | 195—31 R |
| 3,557,091 | 1/1971 | Martin et al. | 195—31 R |
| 3,689,361 | 9/1972 | Speakman | 195—31 R |
| 3,525,672 | 8/1970 | Wurzburg et al. | 195—31 R |

A. LOUIS MONACELL, Primary Examiner

T. G. WISEMAN, Assistant Examiner

U.S. Cl. X.R.

177—33

UNITED STATES PATENT OFFICE
CERTIFICATE OF CORRECTION

Patent No. 3,804,716      Dated April 16, 1974

Inventor(s) Dr. David P. Langlois

It is certified that error appears in the above-identified patent and that said Letters Patent are hereby corrected as shown below:

In the Specification

Column 3, lines 22 and 33, change "disacchardie" to -- disaccharide --.

line 31, change "polysacchardie" to -- polysaccharide --.

Column 6, line 72, change "an" to -- and --.

Column 7, line 28, change "so" to -- no --.

In the Claims

Column 10, line 15, change "wheerin" to -- wherein --.

Signed and Sealed this thirtieth Day of September 1975

[SEAL]

Attest:

RUTH C. MASON
*Attesting Officer*

C. MARSHALL DANN
*Commissioner of Patents and Trademarks*